United States Patent
Fima

[11] 4,069,405
[45] Jan. 17, 1978

[54] SWIMMING POOL ALARM SYSTEM
[75] Inventor: Raoul Fima, Addison, Ill.
[73] Assignee: Fima Laboratories, Inc., Oak Brook, Ill.
[21] Appl. No.: 669,898
[22] Filed: Mar. 24, 1976
[51] Int. Cl.² ............................................. H01H 36/02
[52] U.S. Cl. ............................. 200/84 C; 340/244 A; 340/261; 248/301; 220/18
[58] Field of Search ............... 340/244 R, 244 A, 261; 200/84 C; 335/205, 154; 220/3.9, 18, 85 H; 248/274, 307, 301

[56] References Cited
U.S. PATENT DOCUMENTS

| | | | |
|---|---|---|---|
| 2,980,775 | 4/1961 | Crain | 200/84 C |
| 3,471,664 | 10/1969 | Hansen | 200/84 C |
| 3,482,237 | 12/1969 | Hamburg et al. | 340/261 |
| 3,778,803 | 12/1973 | Jahn | 340/261 |
| 3,803,573 | 4/1974 | Schonger | 340/261 |
| 3,849,771 | 11/1974 | Applin | 340/244 A X |

Primary Examiner—John W. Caldwell, Sr.
Assistant Examiner—Daniel Myer
Attorney, Agent, or Firm—Edmond T. Patnaude

[57] ABSTRACT

A swimming pool alarm system includes a sensor device mounted at the water line of the pool and carrying a magnetically actuated, normally closed switch and a magnet carried by a float for maintaining the switch closed when the water is at a predetermined level whereby the switch closes if the float moves downwardly away therefrom in response, for example, to lifting of the device out of the pool or from wave motion of the water in the pool.

1 Claim, 4 Drawing Figures

SWIMMING POOL ALARM SYSTEM

The present invention relates in general to security-type alarm system of the type which give an alarm when an object, such as a person, enters a swimming pool.

BACKGROUND OF THE INVENTION

Swimming pools, when unattended, present a considerable hazard to small children and other non-swimmers, and as a consequence, various means have been devised to deter children and others from approaching such pools. In addition to the use of physical barriers, different types of sensing systems have been designed for activating an alarm should a person enter the pool area or jump or fall into an unattended pool. For example, several float operated sensors have been designed for activating an alarm in response to wave motion of the water. One problem with these prior art sensors has been the fact that they can be completely removed from the water without actuating the alarm, thereby defeating the purpose of the system. Moreover, they have been difficult to adjust and maintain and as a consequence, they have not been used to any substantial extent.

SUMMARY OF THE INVENTION

Briefly, the present invention provides a swimming pool security system utilizing a low voltage alarm circuit including a preforated housing adapted to be mounted in an asjustably fixed position to a side of the pool at the water. level. A magnetically operated switch having a pair of normally closed contacts is mounted in the housing and a magnet carried by a float movable in the housing holds the switch in the open position as long as the magnet is no greater than a predetermined distance below the switch means. If the float drops, even momentarily, because for example of wave motion of the water, the float moves downwardly away from the switch means permitting the contacts to close and thereby activate the alarm. At the time of installation the position of the housing is set so that wind induced ripples will not set off the alarm but waves created by a small child jumping or falling into the pool will.

BRIEF DESCRIPTION OF THE DRAWING

Further objects and advantages and a better understanding of the present invention can be had by reference to the following detailed description, wherein.

DETAILED DESCRIPTION OF THE INVENTION

Figure 1:
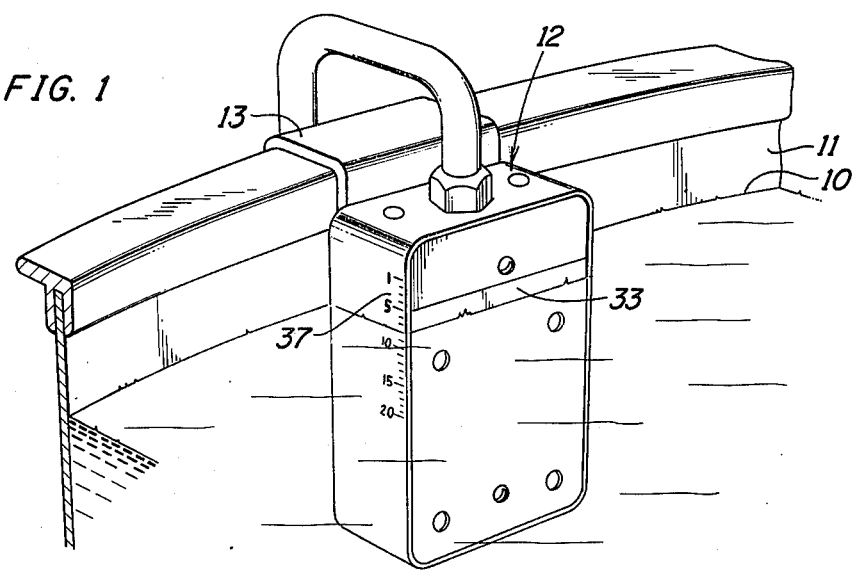
FIG. 1 is a perspective view showing the sensor of the present invention installed in a swimming pool.

Referring to FIG. 1, a body of water having a quiescent surface level 10 is located in a pool having a side wall 11, and a sensor unit 12 embodying the present invention is mounted to the wall by means of a bracket 13. As described more fully hereinafter, the sensor unit 12 is mounted at a fixed position relative to the side wall 11 of the pool, but this position is adjustable. As better shown in FIGS. 3 and 4, the sensor unit 12 incorporates a housing 14 mounted to the bracket 13 by a plurality of screws 15 and 16. The screws 15 and 16 extend through vertical slots 17 and 18 in the housing member 14 for adjusting the height of the sensor 12 relative to the level 10 of the water of the pool. A magnetically operated switch 20 is mounted to the rear wall of the housing member 14 and is completely sealed from the ambient by a suitable non-ferrous encapsulating material 21 such as epoxy to prevent any water or moisture from entering the switch 20. As shown best in FIG. 4, the switch 20 comprises a pair of terminals 22 and 23 located within the encapsulating material. The terminal 23 is connected internally of the switch to a pivotable armature 24 having a contact 25 thereon which is held in contact with a fixed contact 26 by means of a spring 27. The contact 25 is connected to the terminal 22 so that the terminals 22 and 23 are electrically connected together by the normally closed contacts 25 and 26. The armature 24 carries a member 28 formed of a soft magnetic material such, for example as iron, so that a magnetic field below the switch causes the armature 24 to pivot in a counter-clockwise direction to open the contacts 25 and 26.

Figure 3:
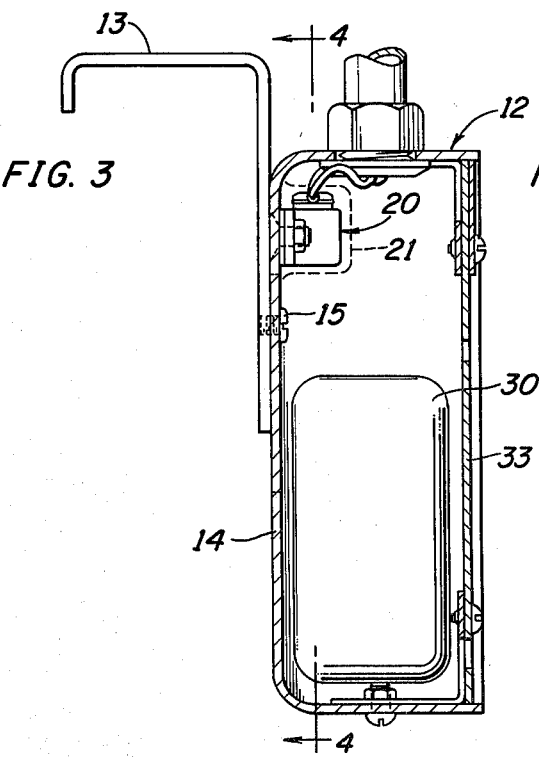
FIG. 3 is a vertical sectional view taken through the float actuated sensor of the present invention.
Figure 4:
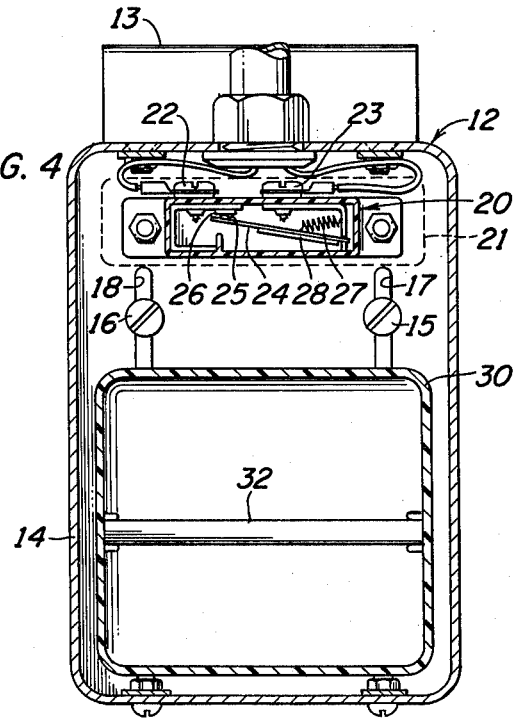
FIG. 4 is a sectional view taken along the lines 4—4 of FIG. 3.

An imperforate float 30 is also mounted within the housing and is freely movable therein between a lower position as illustrated in FIGS. 3 and 4 and an upper position wherein its upward movement is limited by the encapsulating material 21 on the switch 20. A permanent magnetic bar 32 with poles at the opposite ends is carried by the float 30 so that when the float is in an upward position near its upward limit the magnetic field from the magnet 22 is sufficient to maintain the armature 24 in the switch opening downward position. A perforate cover 33 encloses the housing but can be removed for maintenance if necessary.

Figure 2:
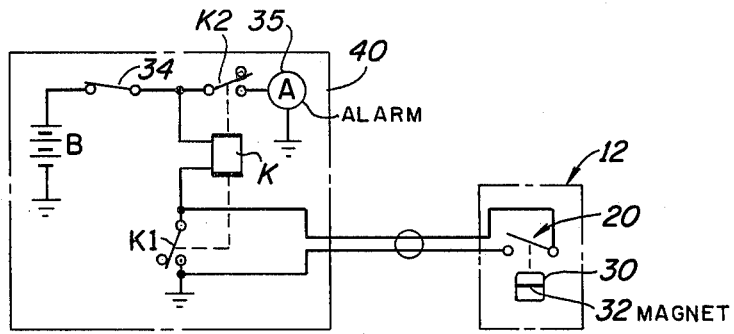
FIG. 2 is a schematic circuit diagram of the system of the present invention.

Referring to FIG. 2 wherein the entire system of the present invention is shown, the contacts of the switch 20 are connected in parallel with a set of normally open contacts K1 or a relay K. The contacts K1 and the coil of the relay K are connected in series with a battery B and a manually operable on-off switch 34. Preferably the switch 34 is key operated so that it cannot be opened by unauthorized personnel. An alarm device 35 such as an electrically operated bell, buzzer or lamp is connected in series with a set of normally open contacts K2 on the relay K and the switch 34 across the battery B.

OPERATION

With the water level 10 at the normal level for which the sensor 12 has been positioned, the magnet 32 is sufficiently close to the switch 20 so as to maintain the contacts in an open position against the closing force exerted thereon by the spring 27. A plurality of numbered graduations 37 are provided on the outside of the cover so that a record of the set position of the sensor relative to the water level can be made. When the pool is to be left unattended and it is desired that persons not use it, the switch 34 is closed. Since the surface of the water will be level at this time, the switch means 20 is open as are the normally open relay contacts K2, wherefor, the alarm device 35 is not actuated. Should, however, a child, person or object enter the pool while the switch 34 is closed, the normal wave motion will cause the float 30 to move downwardly thereby to move the magnet 32 away from the switch means 20 to permit the switch means 20 to close. When the switch means 20 closes, the relay K picks up thereby closing its holding contacts K1 so that the relay remains picked up, and also closing the contacts K2 so that the alarm device is actuated and continues to be actuated until the switch 34 is open. Should the entire device 12 be removed from the pool in an attempt to avoid detection, the float 30 will drop away from the switch 20 thereby sounding the alarm. The leads connecting the sensor to a locked box 40 containing the relay K, the battery B and the alarm 35 are preferably buried in the ground or covered by heavy conduit so as not to be easily cut. Preferably the system of the present invention is battery operated at a voltage of 12 volts so that there is no danger to persons using the pool. Since no current is drawn from the battery except upon detection of an unauthorized object in the pool, the battery life is relatively long.

It will be understood that when using the system of the present invention to protect large swimming pools as used, for example, in hotels and other public places, a plurality of sensor devices 12 are connected in parallel with one another in series with the coil of the relay k whereby closing of any one of the switch means 20 in the several units will cause the alarm to be actuated. The sensitivity of the system depends primarily on the positions at which the sensors are mounted relative to the water level. The sensitivity must be set so that ripples caused by the wind do not set off the alarm. For this reason, the sensitivity can be much greater in indoor pools. The system of the present invention will, of course, also provide an alarm if the water level in the pool drops a sufficient amount to open the switch 20.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. For use in a swimming pool, a device for providing a signal in response to a change in the water level at a particular location in said pool, at which said device is mounted, said device comprising a bracket mounted to a side of said pool, a housing member slidable mounted to said bracket for adjustable movement in a vertical direction, fastening means accessible only from within said housing for locking said housing in an adjusted position of said bracket, a magnetically operated normally closed switch mounted in a fixed position near the top of said housing a substantial distance above said fastening means, an axially polarized permanent bar magnet, a float disposed in said housing between an upper position overlying said fastening means and a lower position below said fastening means, means mounting said magnet at a fixed position in said float whereby said magnet maintains said switch open when said float is in said upper position and permits said switch to close when said float is in said lower position, a cover member secured to said housing member to prevent access to said float and said fastening means, whereby said housing may be positioned whereby said magnet maintains said switch open until the water level in said housing drops a predetermined amount and said switch closes.

* * * * *